United States Patent

Sonnenfeld

[15] 3,635,685
[45] Jan. 18, 1972

[54] POUR POINT DEPRESSANT

[72] Inventor: Richard J. Sonnenfeld, Bartlesville, Okla.
[73] Assignee: Phillips Petroleum Company
[22] Filed: July 24, 1969
[21] Appl. No.: 844,618

[52] U.S. Cl. ........................................44/62, 44/63, 44/70, 44/78
[51] Int. Cl. ............................................C10l 1/22
[58] Field of Search..........................44/58, 62, 63, 70, 78; 260/33.6 A

[56] References Cited

UNITED STATES PATENTS

| | | | |
|---|---|---|---|
| 3,419,365 | 12/1968 | Streets | 44/62 |
| 3,446,740 | 5/1969 | Young et al. | 44/62 |
| 3,479,278 | 11/1969 | De Vault | 44/62 X |

OTHER PUBLICATIONS

C. W. Georgi, Motor Oils and Engine Lubrication, Reinhold Publishing Corp., 1950, pp. 191–193.

*Primary Examiner*—Daniel E. Wyman
*Assistant Examiner*—W. J. Shine
*Attorney*—Young and Quigg

[57] ABSTRACT

Depression of the pour point of a normally liquid hydrocarbonaceous material is obtained by adding to the liquid a hydrogenated butadiene/styrene copolymer which contains a terminal group selected from the group consisting of hydroxy, carboxy and pyridyl, said copolymer having prior to hydrogenation a vinyl unsaturation corresponding to the proportion of styrene in the copolymer, and having a percent unsaturation subsequent to hydrogenation in the range of 1 to 15 percent.

13 Claims, No Drawings

POUR POINT DEPRESSANT

This invention relates to normally liquid hydrocarbonaceous materials having improved pour points. In another aspect, the invention relates to a normally liquid hydrocarbonaceous material having an improved pour point when compounded with a small amount of a hydrogenated butadiene/styrene copolymer containing a terminal group selected from the group consisting of hydroxy, carboxy and pyridyl.

Thus, according to this invention, increased effectiveness as a pour point depressant, when compounded with a normally liquid hydrocarbonaceous material, is achieved when a terminal group selected from the group consisting of hydroxy, carboxy and pyridyl is placed on a hydrogenated butadiene/styrene copolymer which, prior to hydrogenation, has a vinyl unsaturation which is adjusted in relationship to the percentage of styrene in the copolymer and which, subsequent to hydrogenation, has a percentage olefinic saturation in the range from about 1-15 percent.

Suitable copolymers which can be terminated and hydrogenated according to the present invention include random or block copolymers having a molecular weight in the approximate range of from about 1,000 to about 200,000, a preferred range of from about 5,000 to about 50,000, and a still more preferred range of from 15,000 to 30,000. The random copolymers are presently especially useful in this invention. The range of butadiene/styrene in the copolymer can be from about 98/2 to about 50/50 parts by weight, preferably the butadiene/styrene ratio in the copolymer is from 80/20 to 60/40, with particularly good results being obtained with a copolymer having a 70/30 butadiene/styrene ratio.

The hydrogenated copolymer molecular weight referred to in this application refers to number-average molecular weight. The number-average molecular weight of a specific butadiene/styrene copolymer may be determined by any suitable method. For example, a particularly convenient method for determining the molecular weight of copolymers in the 15,000-200,000 range is by the membrane osmometer. Such a procedure is described in a paper by R. E. Steele et al., at the Pittsburgh Conference on Analytical Chemistry and Applied Spectroscopy, in March, 1963. For copolymers in the 5,000-15,000 range, ebullioscopic methods are appropriate, such as the technique described by R. L. Arnett et al., in the *Journal of Polymer Science*, Part A, Volume 1, pages 2,753-2,764 (1963). For copolymers having molecular weights below 5,000, methods employing the use of a vapor pressure osmometer such as that available from Mechrolab, Inc., 1062 Linda Vista Ave., Mountain View, California, are appropriate.

The copolymers of butadiene/styrene can be prepared by any suitable technique. For example, U.S. Pat. No. 2,975,160, filed May 23, 1958, issued Mar. 14, 1961, to Robert P. Zelinski, discloses a suitable method for preparing butadiene copolymers used in the invention. The copolymers of butadiene/styrene can be prepared using organolithium catalysts as described in column 2, lines 66-72, and column 3, lines 1-47, of the above patent. The preferred organolithium compound for use in the present invention is n-butyl-lithium.

The copolymers of this invention can be terminated with a hydroxyl, carboxy or pyridyl group by any suitable method. Specifically, U.S. Pat. No. 3,135,716, issued to Zelinski on Mar. 14, 1961, discloses in column 5, line 75; column 6, lines 1-75; and column 7, lines 1-2, that hydroxy and carboxy groups can be used to terminate terminally reactive polymers prepared by contacting monomers with an organo polyalkali metal compound. The pyridyl terminated polymers of this invention can be prepared in accordance with the disclosure of U.S. Pat. No. 3,178,398, issued to Strobel and Zelinski on Apr. 13, 1965.

The vinyl unsaturation of the polymer can be adjusted, prior to hydrogenation with respect to the amount of styrene present in the polymer, as the amount of styrene and vinyl unsaturation of the parent polymer varies inversely. Within the butadiene/styrene ratio range of about 98/2 to 50/50, the vinyl unsaturation of the polymer can be in the range of about 42 percent to about 8 percent. When the parent polymer has the preferred butadiene/styrene ratio of about 80/20 to about 60/40, the vinyl unsaturation of the polymer is in the range of about 30 percent to about 15 percent and when the butadiene/styrene ratio is about 70/30 the vinyl unsaturation is in the range from about 23-18 percent.

The vinyl unsaturation of the parent copolymer prior to hydrogenation may be controlled by any suitable method. For example, U.S. Pat. No. 3,301,840, filed Sept. 17, 1964, issued Jan. 31, 1967, to Robert P. Zelinski, discloses a suitable method of varying the amount of a polar compound (such as tetrahydrofuran) to control the vinyl content of the polymer. The patent in column 2, lines 20-67, discloses suitable polar compounds which are combined with suitable solvents to provide a polymerization media for the organolithium catalyst to produce a copolymer of the desirable molecular weight and vinyl content.

To obtain desirable pour point depression in the hydrocarbonaceous liquids, the hydrogenated butadiene/styrene copolymers should contain olefinic unsaturation in the range of from about 1 to about 15 percent, or, more particularly, in the range of about 1 to about 10 percent, or preferably in the range of 1-5 percent. Preferably, any hydrogenation technique which has selectivity for hydrogenating olefinic unsaturation (as opposed to aromatic unsaturation) can be used to hydrogenate the copolymers. Specifically, the hydrogenation of the copolymers can be carried out over a nickel octoatetriethylaluminum catalyst system. U.S. Pat. No. 2,864,809, issued to R. V. Jones et al., on Dec. 16, 1958, describes a suitable technique for hydrogenating butadiene-containing polymers. Suitable procedures for adjusting the olefinic unsaturation level of the hydrogenated copolymer are known in the art, including regulation of processing variables such as hydrogen pressure, temperature, the amount of catalyst, and the like.

Since pour point depressants are ordinarily furnished as a solution in a high boiling solvent which is subsequently added to the hydrocarbonaceous liquid to effect pour point depression, the ideal polymerization-hydrogenation process is one in which the polymerization-hydrogenation solvent also serves as the package media for the pour point depressant additive. Thus, it is fully within the scope of the invention to prepare the parent (unhydrogenated) polymers in a solvent and subsequently hydrogenate them in the same solvent which functions additionally as the carrier media for the additive. Suitable solvents are disclosed in U.S. Pat. No. 3,301,840, at column 2, lines 20-34. Specifically, cyclohexane can be used as the solvent and carrier media for the additive. Generally, the hydrogenated butadiene/styrene copolymer will be provided in the solvent in the range from 5 percent to 50 weight percent of additive based on the total weight of the solution.

It is also within the scope of the invention to provide the above-described copolymers dispersed in a carrier such as low-viscosity lubricating oil stock.

The butadiene/styrene copolymers of the invention can be added to any normally liquid hydrocarbonaceous material to effect the depression in pour point of the liquid. Particularly suitable liquids include petroleum distillates or catalytically modified distillates from petroleum, or sources other than petroleum, or mixtures thereof. Specifically, diesel fuel which boils within the range of 350°-625° F. is suitable.

The pour point depressant of the present invention is generally added to fuels in amounts which range from about 0.005 to about 0.5 weight percent (exclusive of carrier), based on the weight of the fuel. In another embodiment, the pour point depressant can be added in amounts ranging from about 0.01 to about 0.1 weight percent, and in one still further embodiment, can be added in the range of about 0.045 weight percent.

Suitable techniques for dispersing the additives in the distillate fuels can be used. In addition to the additives of the present invention, the treated liquids can also contain other commonly used ingredients such as antioxidants, colorants, combustion improvers, antiknock compounds, and the like.

The invention can better be understood by the following examples which are designed to illustrate the invention. It is understood that throughout the examples the additives were added to the liquids in a suitable solvent, usually cyclohexane.

EXAMPLE I

Four different butadiene/styrene copolymers with variable quantities of tetrahydrofuran (THF) were prepared using the polymerization recipe and conditions shown below.

| Run | 1 | 2 | 3 | 4 |
|---|---|---|---|---|
| Polymerization recipe: | | | | |
| Cyclohexane, phw.[1] | 800 | 800 | 800 | 800 |
| 1,3-butadiene (Bd), pbw | 70 | 70 | 70 | 70 |
| Styrene (S), phw | 30 | 30 | 30 | 30 |
| Tetrahydrofuran (THF), phm.[2] | 3.0 | 5.0 | 7.5 | 10.0 |
| n-Butyllithium, mhm.[3] | 4.4 | 4.4 | 4.4 | 4.4 |
| Polymerization conditions: | | | | |
| Temperature, °C | 70 | 70 | 70 | 70 |
| Time, hours | 0.5 | 0.5 | 0.5 | 0.5 |

[1] Parts by weight.
[2] Variable in the range of from 3.0 to 7.5 parts per 100 parts monomer charged (phm.) in order to vary the vinyl content of the copolymer in accordance with U.S. Pat. 3,301,840.
[3] 4.4 mhm. produced a polymer with about 25,000 molecular weight. Mhm. is gram millimoles per 100 grams of monomer charged.

In these runs, cyclohexane was charged to the reactor first followed by a nitrogen purge, then butadiene and styrene were added followed by the THF. Each mixture was agitated at 50° C. for 10 minutes, then at 70° C. for 10 minutes. N-butyllithium was added and the mixtures agitated throughout the polymerization period. At the end of the polymerization period, a portion of each reaction mixture was withdrawn and shortstopped with a 2 weight percent solution of 2,2'-methylene-bis(4-methyl-6-tert-butylphenol) in isopropyl alcohol. The amount of antioxidant solution added was sufficient to provide about 0.5 part by weight of the antioxidant per 100 parts of polymer. After polymerization the product was recovered by evaporation of the cyclohexane solvent to dryness.

A first sample consisting of a portion of the product from each of runs 1 and 2 plus the product of run 4 was isolated for future use in control runs. A second sample consisting of a portion of the product of each of runs 1, 2 and 3 was isolated and each of the copolymers terminated with hydroxy groups by using 4.0 mhm. (0.18 phm.) ethylene oxide in accordance with the teachings of column 6, lines 7–75, and column 7, lines 1–2, of U.S. Pat. No. 3,135,716. A third sample consisting of a portion of the product of each of runs 1, 2 and 3 was isolated and each of the copolymers terminated with carboxy groups by using excess $CO_2$ in accordance with the same teachings of U.S. Pat. No. 3,135,716. The copolymers of a fourth sample consisting of a portion of each of the products of runs 1, 2 and 3 were terminated with pyridyl groups by using 4.0 mhm. (0.32 phm.) pyridine according to the teachings of U.S. Pat. No. 3,178,398.

All samples, both unterminated (runs 1, 2 and 4) and terminated (runs 1, 2 and 3), were submitted for analysis of trans and vinyl unsaturation according to the disclosure of U.S. Pat. No. 3,278,508. The results of the analysis appears in tables I–IV.

After analysis for trans and vinyl unsaturation each of the samples was transferred to another reactor wherein each sample was hydrogenated. The recipe and conditions for the hydrogenation reaction are shown in example II.

EXAMPLE II

| | Hydroxyl terminated | Carboxy terminated | Pyridyl terminated | Unterminated |
|---|---|---|---|---|
| Hydrogenation recipe: | | | | |
| Polymerization mixture[1] | 900 | 900 | 900 | 900 |
| Triethylaluminum (TEA), mhm.[2] | 5.0 | 5.0 | 15.0 | 5.0 |
| Nickel octoate, mhm.[2] | 2.5 | 2.5 | 7.5 | 2.5 |
| Hydrogenation conditions: | | | | |
| Hydrogen pressure, p.s.i.g. | 200 | 200 | 200 | 300 |
| Temperature, °F | 200 | 200 | 200 | 300 |
| Time, hours | 1.0 | 1.0 | 3.0 | 1.0 |

[1] Parts by weight.
[2] Catalyst preformed at about 25° C. for greater than 10 minutes.

At the end of each hydrogenation run, the reaction mixture was withdrawn and acidified with a 10 weight percent solution of hydrochloric acid in isopropyl alcohol. The product was then washed with deionized water until the wash liquid was neutral, then once again. The hydrogenated polymer was then recovered by evaporation of the polymer solution to dryness. The recovered polymer was then submitted for analyses including trans unsaturation, vinyl unsaturation, each of these analytical procedures also in accordance with U.S. Pat. No. 3,278,508. Olefinic unsaturation was determined by iodine chloride titration using the disclosure at column 9, lines 57–69, of U.S. Pat. No. 3,299,016, issued to Sonnenfeld, on Jan. 17, 1967.

EXAMPLE III

A comparison was made between the pour point depressant characteristics of the hydrogenated unterminated polymers from runs 1, 2 and 4 and the hydrogenated terminated polymers of runs 1, 2 and 3. The comparison was conducted in accordance with the method of ASTM D 97–57 using 0.045 weight percent of the hydrogenated polymer based on the weight of a fuel to which the polymer was added. In each test the fuel was a 50 Cetane index diesel fuel having an initial or natural pour point of −5° F. and a boiling point in the range of 350°–625° F. In table I there is indicated the effectiveness as a pour point depressant of the hydrogenated unterminated copolymer of runs 1, 2 and 4 of example I. In tables II, III and IV there is indicated the increased effectiveness of the hydrogenated terminated copolymers of runs 1, 2 and 3 of example I.

TABLE I.—UNTERMINATED COPOLYMER

| Polymer from Example I | Unhydrogenated polymer | | Hydrogenated polymer | | |
|---|---|---|---|---|---|
| | Trans | Vinyl | Trans [1] | Olefinic unsatn., percent | Pour point, °F. |
| Run: | | | | | |
| 1 | 31.0 | 19.2 | 1.5 | 5.9 | −40 |
| 2 | 28.9 | 20.9 | 1.6 | 4.4 | −50 |
| 4 | 26.3 | 24.9 | 4.0 | 9.6 | −10 |

[1] No measurable vinyl band.

TABLE II.—HYDROXY TERMINATED COPOLYMER

| Polymer from Example I | Unhydrogenated polymer | | Hydrogenated polymer | | |
|---|---|---|---|---|---|
| | Trans | Vinyl | Trans [1] | Olefinic unsatn., percent | Pour point, °F. |
| Run: | | | | | |
| 1 | 28.9 | 18.5 | 0.3 | 2.9 | −40 |
| 2 | 25.5 | 20.9 | 0.4 | 3.5 | <−55 |
| 3 | 26.4 | 22.8 | 0.6 | 3.8 | −30 |

[1] No measurable vinyl band.

TABLE III.—CARBOXY TERMINATED COPOLYMER

| Polymer from Example I | Unhydrogenated polymer | | Hydrogenated polymer | | |
|---|---|---|---|---|---|
| | Trans | Vinyl | Trans [1] | Olefinic unsatn., percent | Pour point, °F. |
| Run: | | | | | |
| 1 | 28.6 | 18.5 | 1.0 | 2.7 | −25 |
| 2 | 27.2 | 20.2 | 0.4 | 3.2 | −40 |
| 3 | 25.8 | 22.1 | 0.5 | 3.6 | <−55 |

[1] No measurable vinyl band.

TABLE IV.—PYRIDYL TERMINATED COPOLYMER

| Polymer from Example I | Unhydrogenated polymer | | Hydrogenated polymer | | |
|---|---|---|---|---|---|
| | Trans | Vinyl | Trans [1] | Olefinic unsatn., percent | Pour point, °F. |
| Run: | | | | | |
| 1 | 29.2 | 18.5 | 1.3 | 2.7 | −40 |
| 2 | 27.9 | 22.3 | 0.9 | 3.6 | <−55 |
| 3 | 26.2 | 22.8 | 1.1 | 3.7 | −50 |

[1] No measurable vinyl band.

These data show that increased pour point depression can be achieved when hydroxy, carboxy, and pyridyl terminated hydrogenated butadiene/styrene copolymers are used in place of unterminated hydrogenated butadiene/styrene copolymers as additives to a diesel fuel. Note specifically that in table I the lowest pour point recorded was −50° F. but that in tables II, III and IV a pour point depression of <−55° F. was recorded. Thus, applicant has demonstrated that when hydroxy, carboxy and pyridyl groups are used to terminate hydrogenated butadiene/styrene copolymers increased pour point depression occurs.

I claim:

1. A composition comprising:
   a. a normally liquid hydrocarbonaceous material having a boiling range of 350° to 625° F.; and
   b. a small amount effective to act as a pour point depressant of an additive which consists essentially of a hydrogenated butadiene/styrene copolymer having a molecular weight in the range of from about 1,000 to about 200,000 containing a pyridyl terminal group; said polymer having a butadiene:styrene ratio in the range of about 98:2 to about 50:50; said polymer prior to hydrogenation having a vinyl unsaturation in accordance with the styrene content of the copolymer, said vinyl unsaturation being in the range of about 42 to about 8 percent, and said polymer having been hydrogenated to the extent that the copolymer contains about 1–15 percent olefinic unsaturation subsequent to hydrogenation.

2. A composition according to claim 1 wherein the butadiene/styrene ratio is in the range from about 80/20 to about 60/40.

3. A composition according to claim 2 wherein the butadiene/styrene ratio is about 70/30.

4. A composition according to claim 1 wherein the copolymer contains about 1–10 percent olefinic unsaturation subsequent to hydrogenation.

5. A composition according to claim 4 wherein the copolymer contains about 1–5 percent olefinic unsaturation subsequent to hydrogenation.

6. A composition according to claim 1 wherein the additive is selected from terminated random and block copolymers of butadiene and styrene and is present in an amount in the approximate range of 0.005 to 0.5 weight percent of the liquid hydrocarbonaceous material.

7. A composition according to claim 6 wherein said additive is present in an amount in the approximate range of 0.01 to 0.1 weight percent of the liquid hydrocarbonaceous material.

8. A composition according to claim 7 wherein said additive is present in an amount of approximately 0.045 weight percent of the liquid hydrocarbonaceous material.

9. A composition according to claim 1 wherein the copolymer has a molecular weight in the approximate range of 5,000 to 50,000.

10. A composition according to claim 9 wherein the molecular weight is about 15,000 to about 30,000.

11. A composition according to claim 1 wherein the normally liquid hydrocarbonaceous material is diesel fuel.

12. A concentrate suitable for addition to a normally liquid hydrocarbonaceous material having a boiling range of 350° to 625° F. in order to depress the pour point thereof, said concentrate comprising:
   a. a hydrogenated butadiene/styrene copolymer having a molecular weight in the range of from about 1,000 to about 200,000 and containing a pyridyl terminal group; said copolymer, prior to hydrogenation, containing a vinyl unsaturation in accordance with the styrene content of the copolymer, said vinyl unsaturation being in the range of 42 to 8 percent, and said copolymer subsequent to hydrogenation containing olefinic unsaturation within the copolymer in the range of about 1–15 percent; and
   b. a solvent in which the polymerization of the butadiene/styrene copolymer and the hydrogenation thereof has been accomplished.

13. A concentrate according to claim 12
   a. wherein the solvent is cyclohexane;
   b. wherein the quantity of hydrogenated copolymer comprises about 50 weight percent of said concentrate; and
   c. wherein the quantity of solvent comprises about 50 weight percent of said concentrate.

* * * * *